United States Patent
Hu et al.

(10) Patent No.: US 10,921,914 B2
(45) Date of Patent: Feb. 16, 2021

(54) TOUCH SENSING APPARATUS, TOUCH CONTROL DISPLAY PANEL, TOUCH CONTROL DISPLAY APPARATUS, AND TOUCH SENSING METHOD INCLUDING MAGNETIC SENSOR UNITS

(71) Applicants: BOE TECHNOLOGY GROUP CO., LTD., Beijing (CN); Hefei BOE Optoelectronics Technology Co., Ltd., Anhui (CN)

(72) Inventors: Yansheng Hu, Beijing (CN); Jin Sha, Beijing (CN); Xinchen Ma, Beijing (CN); Zhongqi Zhang, Beijing (CN); Peng Xie, Beijing (CN)

(73) Assignees: BOE TECHNOLOGY GROUP CO., LTD., Beijing (CN); Hefei BOE Optoelectronics Technology Co., Ltd., Anhui (CN)

( * ) Notice: Subject to any disclaimer, the term of this patent is extended or adjusted under 35 U.S.C. 154(b) by 398 days.

(21) Appl. No.: 15/776,955

(22) PCT Filed: Jun. 9, 2017

(86) PCT No.: PCT/CN2017/087692
§ 371 (c)(1),
(2) Date: May 17, 2018

(87) PCT Pub. No.: WO2018/223366
PCT Pub. Date: Dec. 13, 2018

(65) Prior Publication Data
US 2020/0326802 A1    Oct. 15, 2020

(51) Int. Cl.
*G06F 3/041* (2006.01)
*G06F 3/044* (2006.01)
*G06F 3/046* (2006.01)

(52) U.S. Cl.
CPC .............. *G06F 3/041* (2013.01); *G06F 3/046* (2013.01); *G06F 3/0412* (2013.01);
(Continued)

(58) Field of Classification Search
CPC .. G06F 3/0412; G06F 3/04162; G06F 3/0447; G06F 3/046; G06F 3/041; G06F 3/04164
See application file for complete search history.

(56) References Cited

U.S. PATENT DOCUMENTS

| 2010/0265206 A1* | 10/2010 | Chen ...................... G06F 3/044 345/174 |
| 2014/0184505 A1* | 7/2014 | Fullerton ............ G06F 3/03544 345/158 |
| 2018/0143718 A1* | 5/2018 | Kim ...................... G06F 3/0412 |

\* cited by examiner

*Primary Examiner* — Yaron Cohen
(74) *Attorney, Agent, or Firm* — Intellectual Valley Law, P.C.

(57) ABSTRACT

The present application discloses a touch sensing apparatus. The touch sensing apparatus includes a plurality of magnetic sensor units spaced apart from each other, each of which configured to detect a change in magnetic field caused by a first touch input and connected to a first touch integrated circuit. Each of the plurality of magnetic sensor units includes a reference conductor and a plurality of conductors surrounding the reference conductor, the reference conductor and each of the plurality of conductors independently connected to the first touch integrated circuit. The first touch integrated circuit is configured to determine a touch position of based on changes in capacitances between the magnetic sensor and each of the plurality of conductors.

20 Claims, 6 Drawing Sheets

(52) U.S. Cl.
CPC ........ *G06F 3/0447* (2019.05); *G06F 3/04162* (2019.05); *G06F 3/04164* (2019.05)

TOUCH SENSING APPARATUS, TOUCH CONTROL DISPLAY PANEL, TOUCH CONTROL DISPLAY APPARATUS, AND TOUCH SENSING METHOD INCLUDING MAGNETIC SENSOR UNITS

CROSS-REFERENCE TO RELATED APPLICATION

This application is a national stage application under 35 U.S.C. § 371 of International Application No. PCT/CN2017/087692, filed Jun. 9, 2017, the contents of which are incorporated by reference in the entirety.

TECHNICAL FIELD

The present invention relates to touch technology, more particularly, to a touch sensing apparatus, a touch control display panel, a touch control display apparatus, and a touch sensing method.

BACKGROUND

In conventional display apparatuses, a stylus has been used as an input device. For example, a stylus may be connected to a tablet, a personalized digital assistant, or a mobile phone. The movement of the stylus on a surface of a display panel or a touch pad is detected or tracked as it moves across the surface. The movement of the stylus may be displayed as lines on the display panel.

SUMMARY

In one aspect, the present invention provides a touch sensing apparatus, comprising a plurality of magnetic sensor units spaced apart from each other, each of which configured to detect a change in magnetic field caused by a first touch input and connected to a first touch integrated circuit wherein each of the plurality of magnetic sensor units comprises a reference conductor and a plurality of conductors surrounding the reference conductor, the reference conductor and each of the plurality of conductors independently connected to the first touch integrated circuit the first touch integrated circuit is configured to determine a touch position of based on changes in capacitances between the reference conductor and each of the plurality of conductors.

Optionally, the reference conductor is a magnetic sensor configured to detect changes in a magnetic field caused by the first touch input.

Optionally, each of the plurality of conductors is a magnetic sensor configured to detect the change in a magnetic field caused by the first touch input.

Optionally, the changes in capacitances between the reference conductor and each of the plurality of conductors are based on changes in distances between the reference conductor and each of the plurality of conductors in response to the change in the magnetic field caused by the first touch input.

Optionally, the reference conductor is a magnetic sensor configured to undergoes a deformation in response to the change in the magnetic field caused by the first touch input; and the changes in distances between the reference conductor and each of the plurality of conductors are based on the deformation.

Optionally, each of the plurality of conductors is a magnetic sensor configured to undergoes a deformation in response to the change in the magnetic field caused by the first touch input; the changes in distances between the reference conductor and each of the plurality of conductors are based on the deformation.

Optionally, a direction between the reference conductor and the touch position is determined based on a position of one of the plurality of conductors undergoing a maximum change in capacitance with the reference conductor in response to the change in the magnetic field caused by the first touch input among the plurality of conductors; and the touch position is determined based on the direction between the touch position and the reference conductor in each of the plurality of magnetic sensor units.

Optionally, the plurality of conductors surrounding the reference conductor have a substantially the same distance to the reference conductor absent of an exogenous magnetic field; and the direction between the reference conductor and the touch position is determined based on a position of one of the plurality of conductors having a maximum capacitance with the reference conductor in response to the change in the magnetic field ceased by the first touch input among the plurality of conductors.

Optionally, the reference conductor has a substantially rod shape; and each of the plurality of conductors has a substantially plate shape.

Optionally, the reference conductor is made of a magnetizable metal.

Optionally, the reference conductor and the plurality of conductors are made of non-transparent metal materials.

Optionally, the plurality of magnetic sensor units comprises at least three magnetic sensor units.

Optionally, the touch sensing apparatus further comprises a first base substrate and a second base substrate; wherein the plurality of magnetic sensor units are between the first base substrate and the second base substrate; the reference conductor comprises a first terminal and a second terminal; the first terminal is fixedly attached to the first base substrate; and the second terminal is fixedly attached to the second base substrate.

In another aspect, the present invention provides a touch control display panel comprising the touch sensing apparatus described herein.

Optionally, the touch control display panel has a display area and a peripheral area; the plurality of magnetic sensor units are in the peripheral area.

Optionally, the touch control display panel further comprises a stylus comprising a magnet.

In another aspect, the present invention provides a touch control display apparatus comprising a touch control display panel described herein.

In another aspect, the present invention provides a touch sensing method, comprising providing a plurality of magnetic sensor units spaced apart from each other; each of the plurality of magnetic sensor units comprising a reference conductor and a plurality of conductors surrounding the reference conductor; detecting changes in capacitances between the reference conductor and each of a plurality of conductors surrounding the reference conductor; and determining a direction between the reference conductor in each of the plurality of magnetic sensor units and a touch position based on the changes in capacitances between the reference conductor and each of a plurality of conductors surrounding the reference conductor in each of the plurality of magnetic sensor units.

Optionally, detecting the changes in capacitances between the reference conductor and each of a plurality of conductors surrounding the reference conductor comprises detecting changes in distances between the reference conductor and each of a plurality of conductors surrounding the reference conductor.

Optionally, detecting the changes in distances between the reference conductor and each of a plurality of conductors surrounding the reference conductor comprises deforming the reference conductor in response to the change in the magnetic field caused by the touch input.

Optionally, determining the direction between the reference conductor and the touch position comprises determining a position of one of the plurality of conductors having a maximum change in capacitance among the plurality of conductors with the reference conductor.

Optionally, the plurality of magnetic sensor units comprises a first magnetic sensor unit, a second magnetic sensor unit, and a third magnetic sensor unit; and the first magnetic sensor unit comprises a first reference conductor, the second magnetic sensor unit comprises a second reference conductor, and the third magnetic sensor unit comprises a third reference conductor; the method comprising determining a first direction between a first reference conductor and a first position of one of the plurality of conductors surrounding the first reference conductor having a maximum change in capacitance with the first reference conductor; determining a second direction between a second reference conductor and a second position of one of the plurality of conductors surrounding the second reference conductor having a maximum change in capacitance with the second reference conductor; and determining a third direction between a third reference conductor and a third position of one of the plurality of conductors surrounding the third reference conductor having a maximum change in capacitance with the third reference conductor.

BRIEF DESCRIPTION OF THE FIGURES

The following drawings are merely examples for illustrative purposes according to various disclosed embodiments and are not intended to limit the scope of the present invention.

DETAILED DESCRIPTION

The disclosure will now be described more specifically with reference to the following embodiments. It is to be noted that the following descriptions of some embodiments are presented herein for purpose of illustration and description only. It is not intended to be exhaustive or to be limited to the precise form disclosed.

Touch screens have found a wide range of applications in the display field, e.g., in smart phones and tablet computers. For example, in a capacitive touch screen, a touch event (e.g., by a finger) results in capacitance change in a touch electrode layer. A touch position can be determined by detecting the capacitance change in the touch electrode layer. In theory, the conventional capacitive touch screen can have a touch accuracy up to a few pixels. When using a finger to conduct a touch action, however, the highest touch accuracy is in the range of about 1 square centimeter. To achieve a higher touch accuracy, a stylus such as an active pen touch system is required. In conventional touch control display panel, the implementation of the active pen touch system is based on the existing touch control system, e.g., a touch control panel having a transparent touch electrode layer in the display area. To implement the active pen touch system in the existing touch control system, aperture ratio in the touch control display panel will be inevitably affected. To minimize the reduction of the aperture ratio, the wiring of the active pen touch system has to be simplified or limited in a small area. Thus, the sensor pitch of the active pen touch system has to be limited, resulting in a decreased touch accuracy. Moreover, in the conventional touch control display panel, a touch by the active pen touch system and a touch by a finger cannot be concurrently detected, affecting user experience.

Accordingly, the present disclosure provides, inter alia, a touch sensing apparatus, a touch control display panel, a touch control display apparatus, and a touch sensing method that substantially obviate one or more of the problems due to limitations and disadvantages of the related art. In one aspect, the present disclosure provides a touch sensing apparatus. In some embodiments, the touch sensing apparatus includes a plurality of magnetic sensor units spaced apart from each other, each of which configured to detect a change in magnetic field caused by a first touch input and a first touch integrated circuit connected to the plurality of magnetic sensor units. Optionally, each of the plurality of magnetic sensor units includes a reference conductor connected to the first touch integrated circuit; and a plurality of conductors surrounding the reference conductor, each of the plurality of conductors independently connected to the first touch integrated circuit. Optionally, capacitances between the reference conductor and each of the plurality of conductors undergo changes in response to the change in the magnetic field caused by the first touch input. Optionally, the first touch integrated circuit is configured to determine a touch position of the first touch input based on the changes in capacitances between the reference conductor and each of the plurality of conductors.

Figure 1:
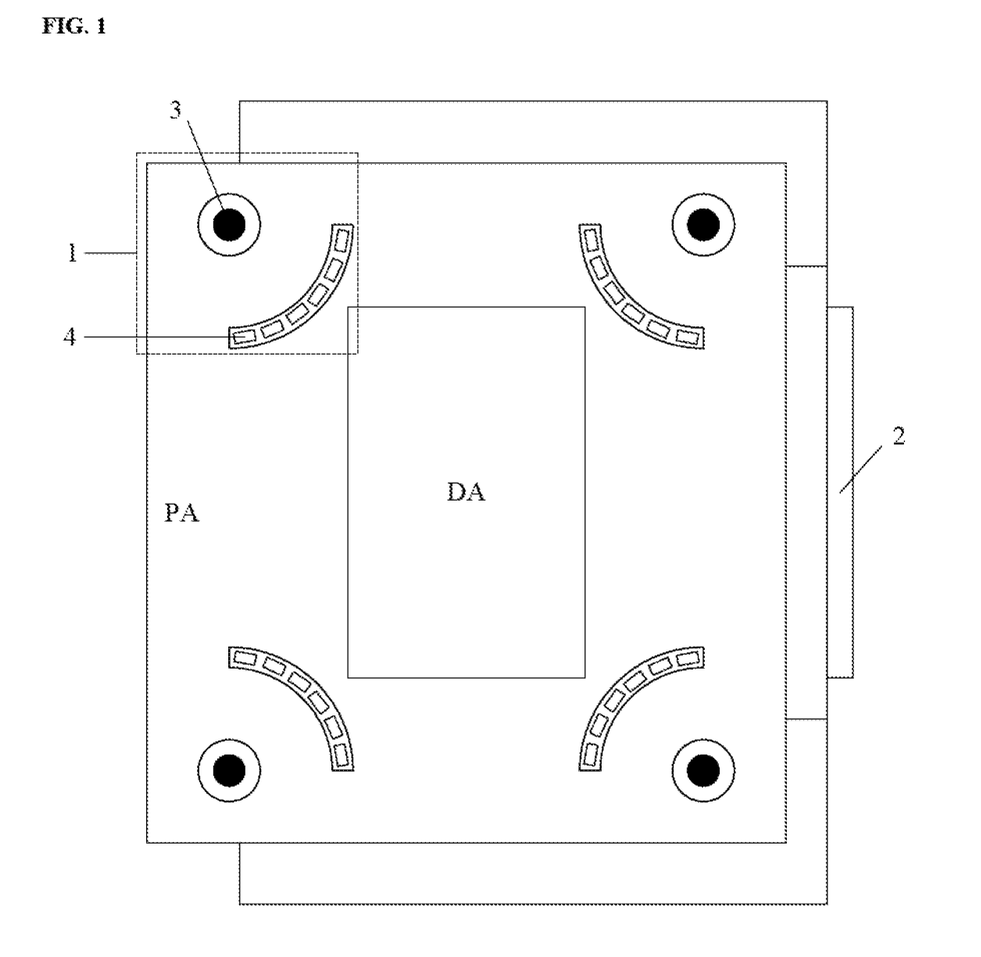
FIG. 1 is a diagram illustrating the structure of a touch sensing apparatus in some embodiments according to the present disclosure.

FIG. 1 is a diagram illustrating the structure of a touch sensing apparatus in some embodiments according to the present disclosure. Referring to FIG. 1, the touch sensing apparatus in some embodiments includes a plurality of magnetic sensor units 1 spaced apart from each other; and a first touch integrated circuit 2 connected to the plurality of magnetic sensor units 1. The touch sensing apparatus may be a component of any electronic apparatus. Optionally, the touch sensing apparatus is a component of a display apparatus. A touch area may be a stand-alone touch area of the electronic apparatus, e.g., a touch pad area of the electronic apparatus. Optionally, the touch area may partially or completely overlap with a display area DA in a display apparatus, as shown in FIG. 1. Optionally, the plurality of magnetic sensor units 1 are disposed in a peripheral area PA of the display apparatus. Optionally, the touch sensing apparatus further includes a stylus be used in combination with the plurality of magnetic sensor units 1. Because the present touch sensing apparatus is magnetic sensing-based touch sensing apparatus, three-dimensional touch control is possible. Optionally, the touch sensing apparatus is a hover-touch control apparatus.

Figure 2:
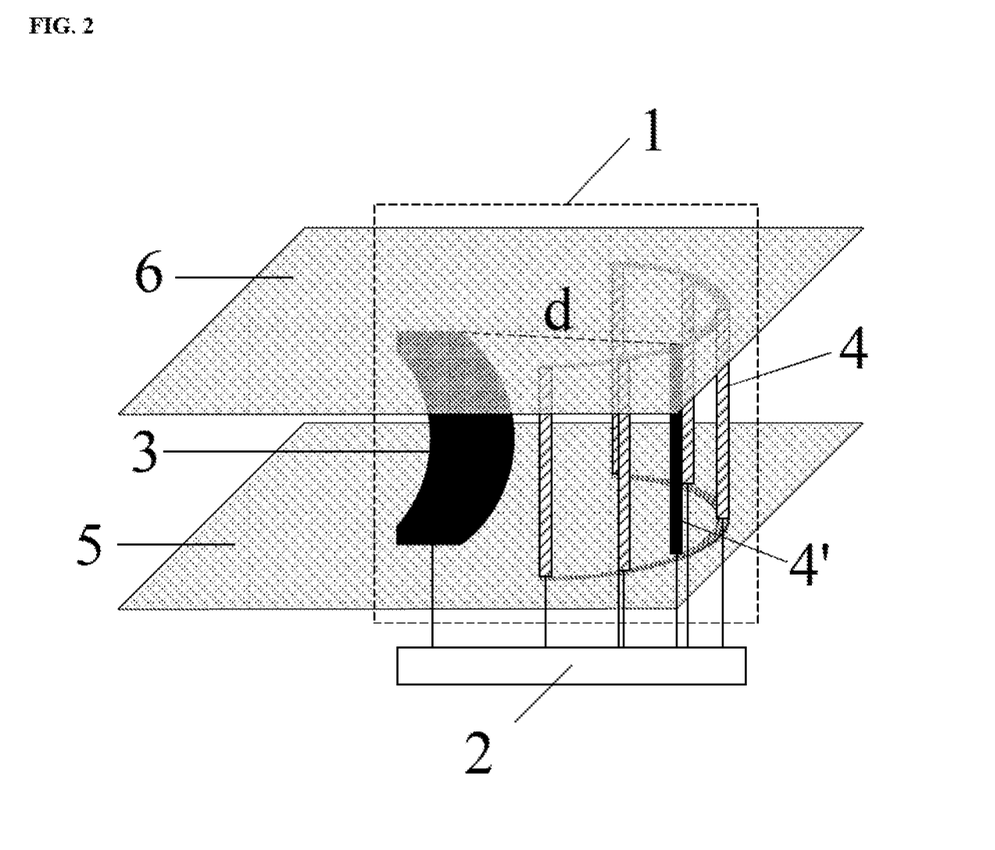
FIG. 2 is a diagram illustrating the structure of a magnetic sensor unit in some embodiments according to the present disclosure.

FIG. 2 is a diagram illustrating the structure of a magnetic sensor unit in some embodiments according to the present disclosure. Referring to FIGS. 1 and 2, each of the plurality of magnetic sensor units 1 includes a reference conductor 3 connected to the first touch integrated circuit 2 and a plurality of conductors 4 surrounding the reference conductor 3, each of the plurality of conductors 4 independently connected to the first touch integrated circuit 2. Each of the plurality of magnetic sensor units 1 is configured to detect a change in a magnetic field caused by a first touch input, e.g., a change in the magnetic field introduced by a magnetic stylus. Optionally, the reference conductor is a magnetic sensor configured to detect the change in the magnetic field caused by the first touch input. Optionally, each of the plurality of conductors is a magnetic sensor configured to independently detect the change in the magnetic field caused by the first touch input.

Because each of the plurality of conductors 4 is independently connected to the first touch integrated circuit 2, and the reference conductor 3 is connected to the first touch integrated circuit 2, a capacitance formed between the reference conductor 3 and each of the plurality of conductors 4 can be independently detected. In some embodiments, capacitances between the reference conductor 3 and each of the plurality of conductors 4 undergo changes in response to the change in the magnetic field caused by the first touch input. The first touch integrated circuit 2 is configured to determine a touch position of the first touch input based on the changes in capacitances between the reference conductor 3 and each of the plurality of conductors 4. For example, a touch position may be determined as an intersecting-lines point between two lines extending along two different directions. In one example, a first direction between the reference conductor 3 in a first one of the plurality of magnetic sensor units 1 and the touch position, and a second direction between the reference conductor 3 in a second one of the plurality of magnetic sensor units 1 and the touch position, can be respectively determined. The intersecting-lines point between the first direction and the second direction can be determined as the touch position. To determine the first direction and the second direction, at least two of the plurality of magnetic sensor units 1 are required. A touch sensing apparatus having two of the plurality of magnetic sensor units 1, however, has a blind line corresponding to the line connecting the two reference conductors in the two of the plurality of magnetic sensor units 1. Optionally, a touch position may be determined as an intersecting-lines point between at least three lines extending along at least three directions. In another example, a first direction between the reference conductor 3 in a first one of the plurality of magnetic sensor units 1 and the touch position, a second direction between the reference conductor 3 in a second one of the plurality of magnetic sensor units 1 and the touch position, and a third direction between the reference conductor 3 in a third one of the plurality of magnetic sensor units 1 and the touch position can be respectively determined. The intersecting-lines point among the first direction, the second direction, and the third direction can be determined as the touch position. Optionally, the touch sensing apparatus includes more than three of the plurality of magnetic sensor units 1, e.g., four or more magnetic sensor units. By having more than three magnetic sensor units, the touch position can be verified by the additional directions between the touch position and the additional magnetic sensor units. By having the additional magnetic sensor units, the touch position can still be accurately determined when one of the magnetic sensor units is malfunctioning or fails.

Any appropriate insulating media may be provided between the reference conductor 3 and the plurality of conductors 4 surrounding the reference conductor 3. Optionally, the reference conductor 3 and the plurality of conductors 4 are insulated by air. Optionally, the reference conductor 3 and the plurality of conductors 4 are insulated by an insulating liquid the reference conductor 3 and the plurality of conductors 4 are insulated by an elastic insulating media. The distance between the reference conductor 3 and the plurality of conductors 4 may be set to be in a range such that the capacitances between the reference conductor 3 and each of the plurality of conductors 4 can be accurately detected.

Various appropriate methods may be used to detect the changes in capacitances between the reference conductor 3 and each of the plurality of conductors 4. In some embodiments, the changes in capacitances between the reference conductor 3 and each of the plurality of conductors 4 are based on changes in distances between the reference conductor 3 and each of the plurality of conductors 4 in response to the change in the magnetic field caused by the first touch input. In some embodiments, the reference conductor 3 is a magnetic sensor configured to undergoes a deformation in response to the change in the magnetic field caused by the first touch input, and the deformation in the reference conductor 3 results in changes in distances between the reference conductor 3 and each of the plurality of conductors 4. Referring to FIG. 2, in some embodiments, the touch sensing apparatus further includes a first base substrate 5 and a second base substrate 6, two ends of the reference conductor 3 are fixedly attached to the first base substrate 5 and the second base substrate 6, respectively, and two ends of each of the plurality of conductors 4 are fixedly attached to the first base substrate 5 and the second base substrate 6, respectively. In one example, and as shown in FIG. 2, the plurality of conductors 4 do not undergo deformation, and the reference conductor 3 undergoes a deformation (e.g., bent). The distances between the reference conductor 3 and each of the plurality of conductors 4 undergo changes in response to the deformation in the reference conductor 3.

Figure 3:
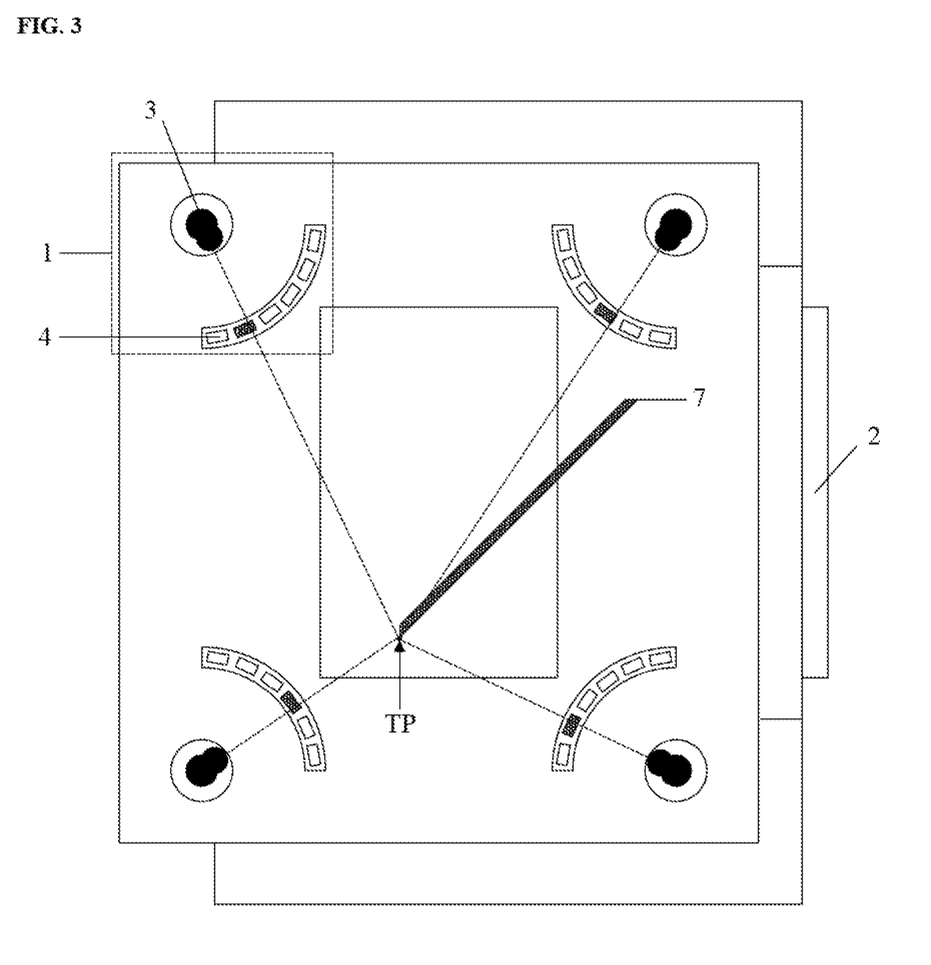
FIG. 3 is a diagram illustrating a mechanism of determining a touch position in some embodiments according to the present disclosure.

FIG. 3 is a diagram illustrating a mechanism of determining a touch position in some embodiments according to the present disclosure. Referring to FIG. 3, the touch position TP can be determined as an intersecting-lines point among a plurality of directions between the touch position TP and the plurality of magnetic sensor units 1. The direction between each reference conductor 3 and the touch position TP can be approximated as the direction between the reference conductor 3 and a position of one of the plurality of conductors 4 undergoing a maximum change in capacitance with the reference conductor 3 (e.g., the conductor 4' in FIG. 2) in response to the change in the magnetic field caused by the first touch input among the plurality of conductors 4. Accordingly, the touch position can be determined based on the direction between the touch position IP and the reference conductor 3 in each of the plurality of magnetic sensor units 1. For example, in each one of the plurality of magnetic sensor units 1, the direction between the reference conductor 3 and the position of one of the plurality of conductors 4 undergoing a maximum change in capacitance with the reference conductor 3 (e.g., the conductor 4' in FIG. 2) in response to the change in the magnetic field caused by the first touch input among the plurality of conductors 4 can be used as the direction between the touch position TP and the reference conductor 3 in each of the plurality of magnetic sensor units 1. The intersecting-lines point among several directions respectively derived from the plurality of magnetic sensor units 1 can be determined as the touch position.

FIG. 2, the reference conductor 3 is shown to be a magnetic sensor configured to undergoes a deformation in response to the change in the magnetic field caused by the first touch input. In one example, the reference conductor 3 is made of a magnetizable metal, e.g., iron-containing material. In response to a magnetic field, e.g., from a stylus, the reference conductor 3 is magnetically attracted to the stylus, and is bent towards the stylus. In another example, the reference conductor 3 is made of a magnet. In response to a magnetic field, e.g., from a stylus, the reference conductor 3 undergoes a deformation. Optionally, the magnet in the reference conductor 3 has a magnetic polarity on a side of the reference conductor 3 proximal to the stylus that is the same as that of the stylus on a side of the stylus proximal to the reference conductor 3, the reference conductor 3 is magnetically repelled by the stylus, and is bent away from the stylus. Optionally, the magnet in the reference conductor 3 has a magnetic polarity on a side of the reference conductor 3 proximal to the stylus that is opposite to that of the stylus on a side of the stylus proximal to the reference conductor 3, the reference conductor 3 is magnetically attracted by the stylus, and is bent towards the stylus.

In some embodiments, each of the plurality of conductors 4 is a magnetic sensor and configured to undergoes a deformation in response to the change in the magnetic field caused by the first touch input, the deformation in each of the plurality of conductors 4 results in the changes in distances between the reference conductor 3 and each of the plurality of conductors 4. Optionally, the reference conductor 3 is not a magnetic sensor and does not undergo deformation in response to the change in the magnetic field caused by the first touch input. In one example, the plurality of conductors 4 are made of a magnetizable metal, e.g., iron-containing material. In response to a magnetic field, e.g., from a stylus, the plurality of conductors 4 are magnetically attracted to the stylus, and is bent towards the stylus. In another example, the plurality of conductors 4 are made of a magnet. In response to a magnetic field, e.g., from a stylus, the plurality of conductors 4 undergo a deformation. Optionally, the magnet in the plurality of conductors 4 has a magnetic polarity on a side of the plurality of conductors 4 proximal to the stylus that is the same as that of the stylus on a side of the stylus proximal to the plurality of conductors 4, the plurality of conductors 4 are magnetically repelled by the stylus, and are bent away from the stylus. Optionally, the magnet in the plurality of conductors 4 have a magnetic polarity on a side of the plurality of conductors 4 proximal to the stylus that is opposite to that of the stylus on a side of the stylus proximal to the plurality of conductors 4, the plurality of conductors 4 are magnetically attracted by the stylus, and are bent towards the stylus.

In some embodiments, and as shown in FIG. 2, the distances between the reference conductor 3 and the plurality of conductors 4 decrease in response to an exogenous magnetic field as compared to those absent of the exogenous magnetic field. In one example, and referring to FIGS. 1-3, absent of an exogenous magnetic field (e.g., one that is introduced by a stylus 7 having a magnet during a touch event), the plurality of conductors 4 surrounding the reference conductor 3 have a substantially the same distance to the reference conductor 3. Thus, absent of the exogenous magnetic field or absent of a magnetic field introduced by a stylus 7 having a magnet during a touch event, each of the plurality of conductors 4 surrounding the reference conductor 3 have a substantially the same capacitance with the reference conductor 3. Optionally, the direction between the reference conductor 3 and the touch position TP is determined based on a position of one of the plurality of conductors 4 having a maximum capacitance with the reference conductor 3 (e.g., the conductor 4' in FIG. 2) in response to the change in the magnetic field caused by the first touch input among the plurality of conductors 4. In one example, the direction between the reference conductor 3 and the touch position TP is approximated as the direction between the reference conductor 3 and the position of one of the plurality of conductors 4 having a maximum capacitance with the reference conductor 3 in response to the change in the magnetic field caused by the first touch input among the plurality of conductors 4.

In some embodiments, the distances between the reference conductor 3 and the plurality of conductors 4 increase in response to an exogenous magnetic field as compared to those absent of the exogenous magnetic field. In one example, absent of an exogenous magnetic field (e.g., one that is introduced by a stylus 7 having a magnet during a touch event), the plurality of conductors 4 surrounding the reference conductor 3 have a substantially the same distance to the reference conductor 3. Thus, absent of the exogenous magnetic field or, absent of a magnetic field introduced by a stylus 7 having a magnet during a touch event, each of the plurality of conductors 4 surrounding the reference conductor 3 have a substantially the same capacitance with the reference conductor 3, Optionally, the direction between the reference conductor 3 and the touch position TP is determined based on a position of one of the plurality of conductors 4 having a minimum capacitance with the reference conductor 3 in response to the change in the magnetic field caused by the first touch input among the plurality of conductors 4. In one example, the direction between the reference conductor 3 and the touch position TP is approximated as the direction between the reference conductor 3 and the position of one of the plurality of conductors 4 having a minimum capacitance with the reference conductor 3 in response to the change in the magnetic field caused by the first touch input among the plurality of conductors 4.

The reference conductor 3 and the plurality of conductors 4 may be made of various appropriate shapes and dimensions. Optionally, the reference conductor 3 has a substantially rod shape. Optionally, the reference conductor 3 has a substantially plate shape. Optionally, each of the plurality of conductors 4 has a substantially rod shape. Optionally, each of the plurality of conductors 4 has a substantially plate shape. Optionally, the plurality of conductors 4 are substantially parallel to the reference conductor 3 absent of an exogenous magnetic field (e.g., one that is introduced by a stylus 7 having a magnet during a touch event). Optionally, the reference conductor 3 has a substantially flat shape. Optionally, the reference conductor 3 has a curved shape. Optionally, each of the plurality of conductors 4 has a substantially flat shape, Optionally, each of the plurality of conductors 4 has a curved shape. Optionally, each of the plurality of conductors 4 has a substantially uniform shape. Optionally, the plurality of conductors 4 have non-uniform shapes.

Referring to FIGS. 1 to 3, in some embodiments, the plurality of conductors 4 are arranged surrounding the reference conductor 3. Optionally, the cross-section of the plurality of conductors 4 are along a virtual partial circular line or a virtual full circular line. Optionally, the reference conductor 3 is at the center of the virtual partial circular line or the virtual full circular line. Optionally, the distances between the reference conductor 3 and a mid-point of each of the plurality of conductors 4 are substantially the same. Optionally, the distances between a mid-point of the reference conductor 3 and a mid-point of each of the plurality of conductors 4 are substantially the same.

Figure 4:
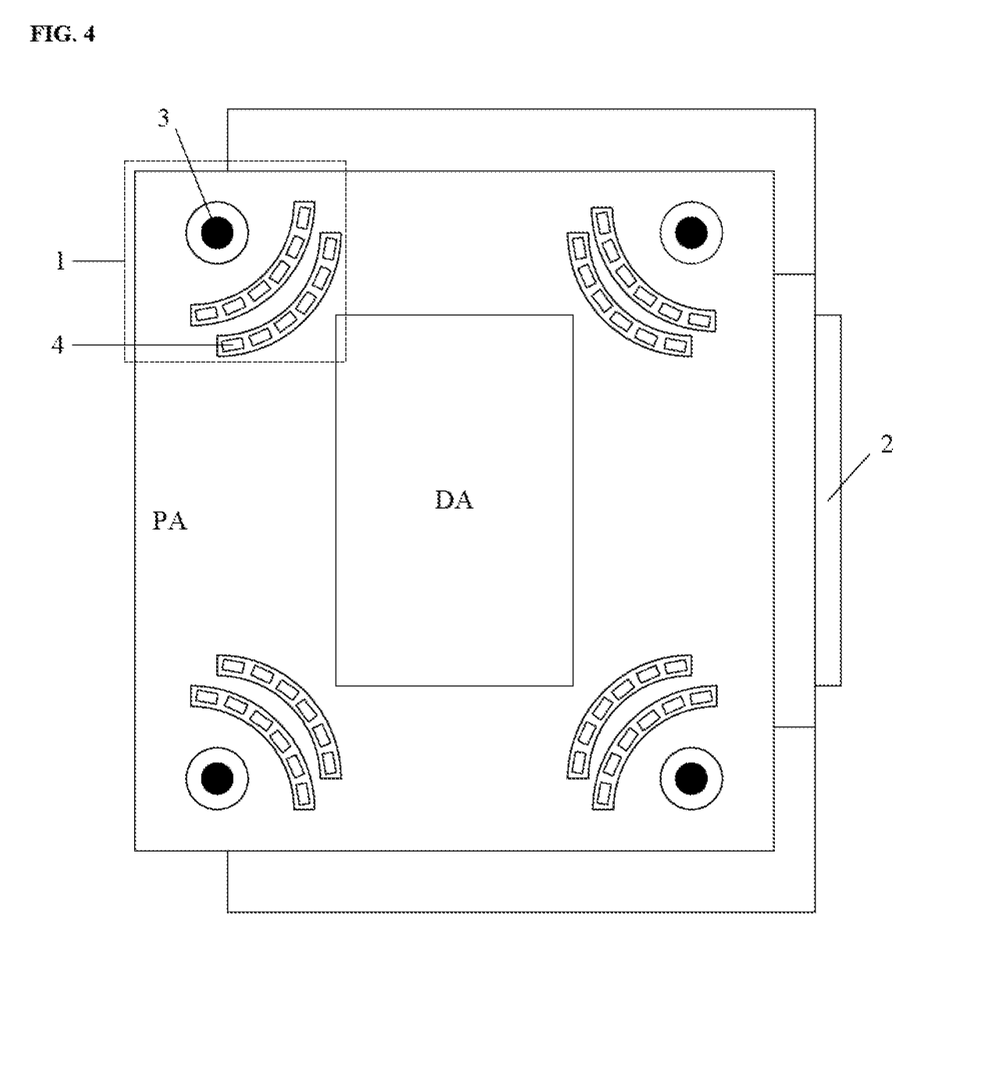
FIG. 4 is a diagram illustrating the structure of a touch sensing apparatus in some embodiments according to the present disclosure.

FIG. 4 is a diagram illustrating the structure of a touch sensing apparatus in some embodiments according to the present disclosure. Referring to FIG. 4, each of the plurality of magnetic sensor units 1 in some embodiments includes a plurality of layers of conductors. Each layer of the plurality of layers of conductors includes a plurality of conductors 4 surrounding the reference conductor 3. FIG. 4 shows a plurality of magnetic sensor units 1 each of which includes two layers of conductors, e.g., a first layer of conductors and a second layers of conductors. Accordingly, the direction between the reference conductor 3 and the touch position is determined based on a first position of one of the plurality of conductors 4 in the first layer that undergoes a maximum change in capacitance with the reference conductor 3 in response to the change in the magnetic field caused by the first touch input among the plurality of conductors 4 in the first layer, and a second position of one of the plurality of conductors 4 in the second layer that undergoes a maximum change in capacitance with the reference conductor 3 in response to the change in the magnetic field caused by the first touch input among the plurality of conductors 4 in the second layer. Optionally, the direction between the touch position and the reference conductor 3 in each of the plurality of magnetic sensor units 1 is determined solely based on the direction between the first position and the second position and the touch position is determined based on the direction between the first position and the second position in each of the plurality of magnetic sensor units 1. Optionally, the direction between the touch position and the reference conductor 3 in each of the plurality of magnetic sensor units 1 is determined based on an alignment of the reference conductor 3, the first position, and the second position; and the touch position is determined based on the direction between the aligned direction in each of the plurality of magnetic sensor units 1.

In some embodiments, the touch sensing apparatus is a part of a touch control display panel. As shown in FIGS. 1, 3, and 4, the touch control display panel in some embodiments includes a peripheral area PA and a display area DA. Optionally, the touch sensing apparatus is in the peripheral area PA of the touch control display panel. Because the touch sensing apparatus is disposed in the peripheral area PA, the touch sensing apparatus can be made of non-transparent materials. For example, the reference conductor 3 and the plurality of conductors 4 can be made of non-transparent metal materials. Optionally, the touch integrated circuit and the signal lines connecting the plurality of magnetic sensor units with the driving circuit are disposed in the peripheral area PA. By having this design, the aperture ratio of a display panel having the touch sensing apparatus will not be affected at all.

As used herein, the term "display area" refers to an area of a display panel where image is actually displayed. Optionally, the display area may include both a subpixel region and an inter-subpixel region. A subpixel region refers to a light emission region of a subpixel, such as a region corresponding to a pixel electrode in a liquid crystal display or a region corresponding to a light emissive layer in an organic light emitting diode display panel. An inter-subpixel region refers to a region between adjacent subpixel regions, such as a region corresponding to a black matrix in a liquid crystal display or a region corresponding a pixel definition layer in an organic light emitting diode display panel. Optionally, the inter-subpixel region is a region between adjacent subpixel regions in a same pixel. Optionally, the inter-subpixel region is a region between two adjacent subpixel regions from two adjacent pixels.

As used herein the term "peripheral area" refers to an area of a display panel where various circuits and wires are provided to transmit signals to the display panel. To increase the transparency of the display panel, non-transparent or opaque components of the display panel (e.g., battery, printed circuit board, metal frame can be disposed in the peripheral area rather than in the display areas.

Optionally, the plurality of magnetic sensor units 1 are disposed at corners of the touch control display panel, as shown in FIGS. 1, 3, and 4.

Figure 5:
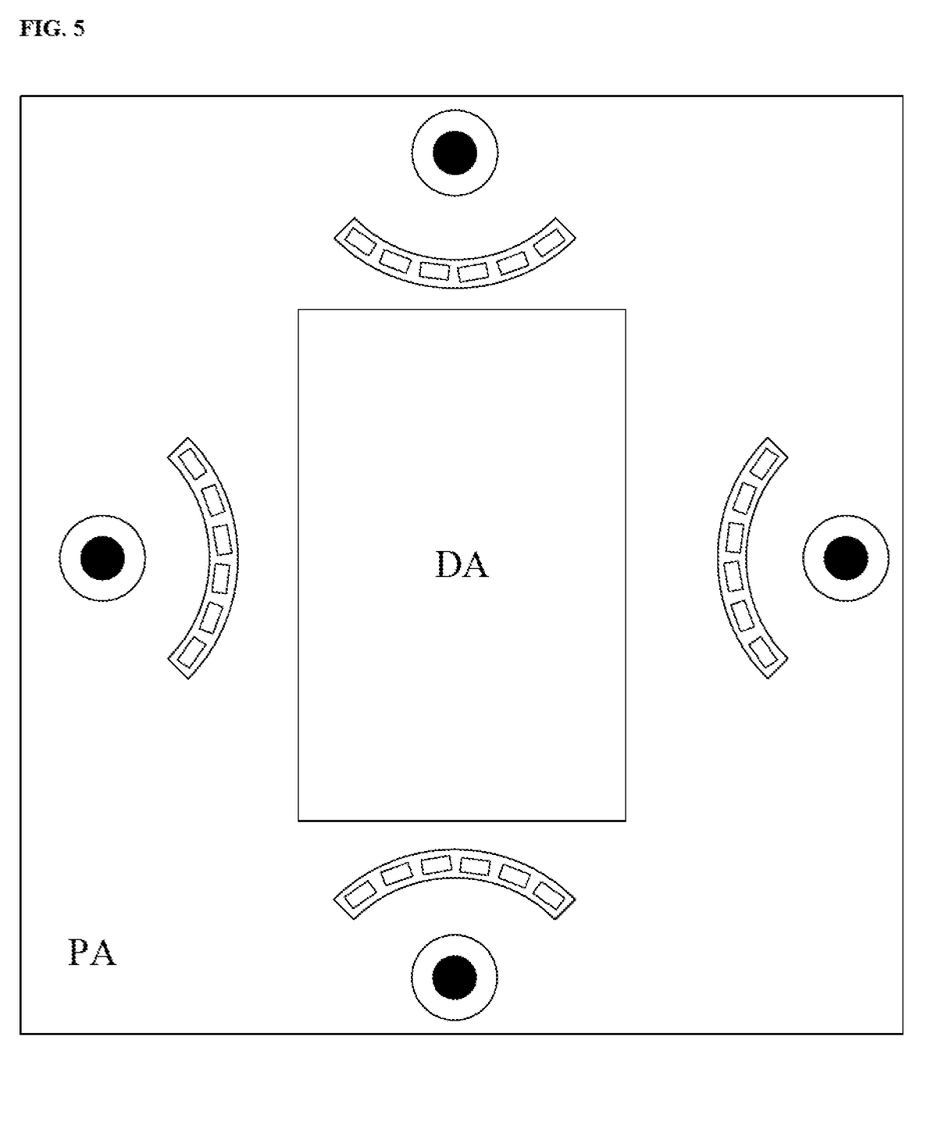
FIG. 5 is a diagram illustrating the structure of a touch sensing apparatus in some embodiments according to the present disclosure.
Figure 6:
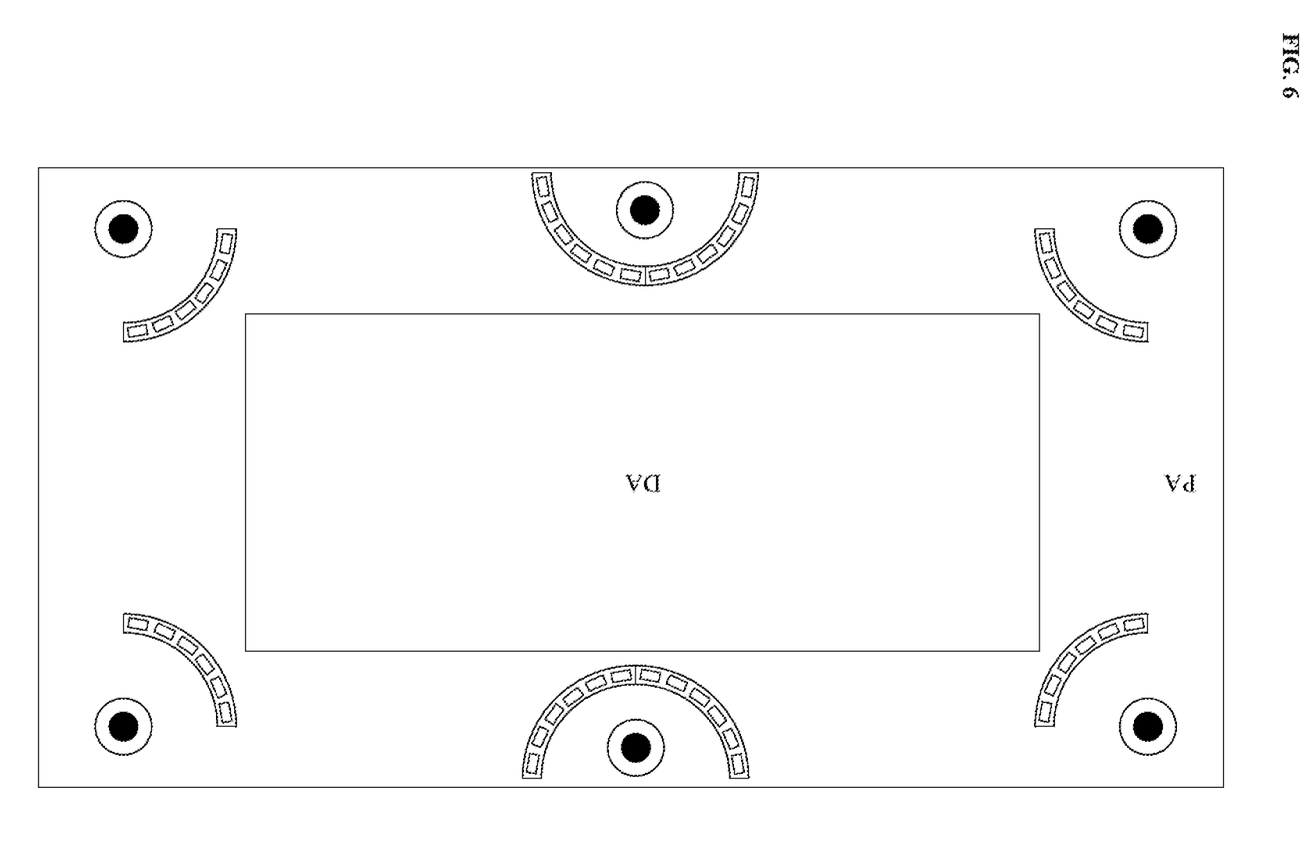
FIG. 6 is a diagram illustrating the structure of a touch sensing apparatus in some embodiments according to the present disclosure.

FIGS. 5 and 6 are diagrams illustrating the structures of touch sensing apparatuses in some embodiments according to the present disclosure. Referring to FIG. 5, the plurality of magnetic sensor units 1 are disposed at edges of the touch control display panel. Referring to FIG. 6, the plurality of magnetic sensor units 1 are disposed at edges and corners of the touch control display panel.

Optionally, at least one of the plurality of magnetic sensor units 1 is disposed on a back side of the touch control display panel, e.g., a side opposite to the light emitting side of the touch control display panel. Optionally, the touch integrated circuit and the signal lines connecting, the plurality of magnetic sensor units with the driving circuit are disposed on the back side of the touch control display panel. By having this design the aperture ratio of a display panel having the touch sensing apparatus will not be affected at all.

Optionally, the touch sensing apparatus includes at least three magnetic sensor units. Optionally, the touch sensing apparatus includes four magnetic sensor units. Optionally, the touch sensing apparatus includes more than four magnetic sensor units (see, e.g., FIG. 6).

Optionally, all of the plurality of magnetic sensor units 1 are outside the display area. Optionally, the touch sensing apparatus includes one or more magnetic sensor units surrounding the display area, e.g., at the center of the touch control display panel. Optionally, at least one of the plurality of magnetic sensor units 1 is disposed on a back side of the touch control display panel. When the magnetic sensor units are disposed on the back side of the touch control display panel, they can be in the display area. Optionally, the magnetic sensor units are disposed on the back side of the touch control display panel in the peripheral area.

Optionally, the touch sensing apparatus includes a stylus. Optionally, the stylus is a pen, e.g., an active pen. Optionally, the stylus includes a magnet, e.g., a permanent magnet. Optionally, the stylus further includes a pressure sensor configured to detect a pressure of a touch. For example, the touch control display panel can display a thicker line or a thinner line depending on the magnitude of the pressure applied by the stylus during a touch event.

In another aspect, the present disclosure further provides a touch control display panel having a touch sensing apparatus described herein. Optionally, the touch control display panel includes a display area and a peripheral area. Optionally, the plurality of magnetic sensor units are in the peripheral area.

In some embodiments, the touch control display panel further includes a transparent touch electrode layer in the display area for detecting a second touch input. Optionally, the transparent touch electrode layer is connected to a second touch integrated circuit independent of the first touch integrated circuit. Optionally, the touch display panel is configured to detect the first touch input and the second touch input concurrently. The detection of the first touch input and the detection of the second touch input do not interfere with each other. By having this design, the touch control display panel can realize finger touch control and stylus touch control at the same time.

In another aspect, the present disclosure further provides a touch control display apparatus having a touch control display panel described herein. Examples of appropriate touch control display apparatuses include, but are not limited to, an electronic paper, a mobile phone, a tablet computer, a television, a monitor, a notebook computer, a digital album, a GPS, etc.

In another aspect, the present disclosure further provides a touch sensing method. In some embodiments, the touch sensing method includes providing a plurality of magnetic sensor units spaced apart from each other; each of the plurality of magnetic sensor units including a reference conductor and a plurality of conductors surrounding the reference conductor; detecting changes in capacitances between the reference conductor and each of a plurality of conductors surrounding the reference conductor; and determining a direction between the reference conductor in each of the plurality of magnetic sensor units and a touch position based on the changes in capacitances between the reference conductor and each of a plurality of conductors surrounding the reference conductor in each of the plurality of magnetic sensor units.

In some embodiments, the step of detecting the changes in capacitances between the reference conductor and each of a plurality of conductors surrounding the reference conductor includes detecting changes in distances between the reference conductor and each of a plurality of conductors surrounding the reference conductor.

In some embodiments, the reference conductor is a magnetic sensor configured to detect the change in the magnetic field caused by the first touch input; and the step of detecting the changes in distances between the reference conductor and each of a plurality of conductors surrounding the reference conductor includes deforming the reference conductor in response to the change in the magnetic field caused by the touch input.

In some embodiments, each of the plurality of conductors is a magnetic sensor configured to independently detect the change in the magnetic field caused by the touch input; and the step of detecting the changes in distances between the reference conductor and each of a plurality of conductors surrounding the reference conductor includes deforming the plurality of conductors in response to the change in the magnetic field caused by the touch input.

In some embodiments, the step of determining the direction between the reference conductor and the touch position includes determining a position of one of the plurality of conductors having a maximum change in capacitance among the plurality of conductors with the reference conductor. Optionally, the step of determining the direction between the reference conductor and the touch position includes determining a direction between the reference conductor and the position of one of the plurality of conductors having a maximum change in capacitance among the plurality of conductors with the reference conductor. Optionally, absent of the exogenous magnetic field (e.g., one introduced by a stylus having a magnet during a touch event), each of the plurality of conductors surrounding the reference conductor have a substantially the same capacitance with the reference conductor. Optionally, the step of determining the direction between the reference conductor and the touch position includes determining a position of one of the plurality of conductors having a maximum capacitance among the plurality of conductors with the reference conductor. Optionally, the step of determining the direction between the reference conductor and the touch position includes determining a direction between the reference conductor and the position of one of the plurality of conductors having a maximum capacitance among the plurality of conductors with the reference conductor. Optionally, the step of determining the direction between the reference conductor and the touch position includes determining a position of one of the plurality of conductors having a minimum capacitance among the plurality of conductors with the reference conductor. Optionally, the step of determining the direction between the reference conductor and the touch position includes determining a direction between the reference conductor and the position of one of the plurality of conductors having a minimum capacitance among the plurality of conductors with the reference conductor.

In some embodiments, the plurality of magnetic sensor units include a first magnetic sensor unit, a second magnetic sensor unit, and a third magnetic sensor unit. The first magnetic sensor unit includes a first reference conductor and a plurality of conductors surrounding the first reference conductor. The second magnetic sensor unit includes a second reference conductor and a plurality of conductors surrounding the second reference conductor. The third magnetic sensor unit includes a third reference conductor and a plurality of conductors surrounding the third reference conductor.

In some embodiments, the touch sensing method includes determining a first direction between a first reference conductor and a first position of one of the plurality of conductors surrounding the first reference conductor having a maximum change in capacitance with the first reference conductor; and determining a second direction between a second reference conductor and a second position of one of the plurality of conductors surrounding the second reference conductor having a maximum change in capacitance with the second reference conductor. Optionally, the method includes determining a first direction between a first reference conductor and a first position of one of the plurality of conductors surrounding the first reference conductor having a maximum capacitance with the first reference conductor; and determining a second direction between a second reference conductor and a second position of one of the plurality of conductors surrounding the second reference conductor having a maximum capacitance with the second reference conductor. Optionally, the method includes determining a first direction between a first reference conductor and a first position of one of the plurality of conductors surrounding the first reference conductor having a minimum capacitance with the first reference conductor; and determining a second direction between a second reference conductor and a second position of one of the plurality of conductors surrounding the second reference conductor having a minimum capacitance with the second reference conductor.

In some embodiments, the touch sensing method includes determining a first direction between a first reference conductor and a first position of one of the plurality of conductors surrounding the first reference conductor having a maximum change in capacitance with the first reference conductor; determining a second direction between a second reference conductor and a second position of one of the plurality of conductors surrounding the second reference conductor having a maximum change in capacitance with the second reference conductor; and determining a third direction between a third reference conductor and a third position of one of the plurality of conductors surrounding the third reference conductor having a maximum change in capacitance with the third reference conductor. Optionally, the method includes determining a first direction between a first reference conductor and a first position of one of the plurality of conductors surrounding the first reference conductor having a maximum capacitance with the first reference conductor; determining a second direction between a second reference conductor and a second position of one of the plurality of conductors surrounding the second reference conductor having a maximum capacitance with the second reference conductor; and determining a third direction between a third reference conductor and a third position of one of the plurality of conductors surrounding the third reference conductor having a maximum capacitance with the third reference conductor. Optionally, the method includes determining a first direction between a first reference conductor and a first position of one of the plurality of conductors surrounding the first reference conductor having a minimum capacitance with the first reference conductor; determining a second direction between a second reference conductor and a second position of one of the plurality of conductors surrounding the second reference conductor having a minimum capacitance with the second reference conductor; and determining a third direction between a third reference conductor and a third position of one of the plurality of conductors surrounding the third reference conductor having a minimum capacitance with the third reference conductor.

In some embodiments, the plurality of magnetic sensor units includes a plurality of layers of conductors. Each layer of the plurality of layers of conductors includes a plurality of conductors surrounding the reference conductor. In some embodiments, each of the plurality of magnetic sensor units includes two layers of conductors, e.g., a first layer of conductors and a second layers of conductors. In some embodiments, the step of determining the direction between the reference conductor and the touch position includes determining a first position of one of the plurality of conductors in the first layer that undergoes a maximum change in capacitance with the reference conductor in response to the change in the magnetic field caused by the touch input among the plurality of conductors in the first layer, and determining a second position of one of the plurality of conductors in the second layer that undergoes a maximum change in capacitance with the reference conductor in response to the change in the magnetic field caused by the touch input among the plurality of conductors in the second layer. Optionally, the step of determining the direction between the touch position and the reference conductor in each of the plurality of magnetic sensor units includes determining the direction between the first position and the second position; and the step of determining the touch position includes determining the direction between the first position and the second position in each of the plurality of magnetic sensor units. Optionally, the step of determining the direction between the touch position and the reference conductor in each of the plurality of magnetic sensor units includes determining an alignment direction of the reference conductor, the first position, and the second position; and the step of determining the touch position includes determining the alignment direction in each of the plurality of magnetic sensor units.

The foregoing description of the embodiments of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which, all terms are meant in their broadest reasonable sense unless otherwise indicated. Therefore, the term "the invention", "the present invention" or the like does not necessarily limit the claim scope to a specific embodiment, and the reference to exemplary embodiments of the invention does not imply a limitation on the invention, and no such limitation is to be inferred. The invention is limited only by the spirit and scope of the appended claims. Moreover, these claims may refer to use "first", "second", etc. following with noun or element. Such terms should be understood as a nomenclature and should not be construed as giving the limitation on the number of the elements modified by such nomenclature unless specific number has been given. Any advantages and benefits described may not apply to all embodiments of the invention. It should be appreciated that variations may be made in the embodiments described by persons skilled in the art without departing from the scope of the present invention as defined by the following claims. Moreover, no element and component in the present disclosure is intended to be dedicated to the public regardless of whether the element or component is explicitly recited in the following claims.

What is claimed is:

1. A touch sensing apparatus, comprising:
a first base substrate;
a second base substrate; and
a plurality of magnetic sensor units between the first base substrate and the second base substrate, a respective one of the plurality of magnetic sensor units being configured to detect a change in magnetic field caused by a first touch input and connected to a first touch integrated circuit;
wherein the respective one of the plurality of magnetic sensor units comprises a reference conductor and a plurality of conductors surrounding the reference conductor, the reference conductor and each of the plurality of conductors independently connected to the first touch integrated circuit;
wherein the first touch integrated circuit is configured to determine a touch position based on changes in capacitances between the reference conductor and each of the plurality of conductors;
wherein the reference conductor comprises a first end fixedly attached to the first base substrate, a second end fixedly attached to the second base substrate, and a reference conductor body continuously extending from the first end to the second end;
a respective one of the plurality of conductors has a third end fixedly attached to the first base substrate, a fourth end fixedly attached to the second base substrate, and a conductor body continuously extending from the third end to the fourth end;

the plurality of conductors in the respective one of the plurality of magnetic sensor units are arranged along a virtual partial circular line or a virtual full circular line centering around the reference conductor;

distances respectively between a mid-point of the reference conductor body of the reference conductor and mid-points of the conductor bodies of the plurality of conductors are substantially the same;

the plurality of magnetic sensor units are spaced apart from each other and respectively surrounding a periphery of a central area;

in each of the plurality of magnetic sensor units, the virtual partial circular line or the virtual full circular line is between the central area and the reference conductor.

2. The touch sensing apparatus of claim 1, wherein the reference conductor is a magnetic sensor configured to detect changes in a magnetic field caused by the first touch input.

3. The touch sensing apparatus of claim 1, wherein each of the plurality of conductors is a magnetic sensor configured to detect the change in a magnetic field caused by the first touch input.

4. The touch sensing apparatus of claim 1, wherein the changes in capacitances between the reference conductor and each of the plurality of conductors are based on changes in distances between the reference conductor and each of the plurality of conductors in response to the change in the magnetic field caused by the first touch input.

5. The touch sensing apparatus of claim 4, wherein the reference conductor is a magnetic sensor configured to undergoes a deformation in response to the change in the magnetic field caused by the first touch input; and the changes in distances between the reference conductor and each of the plurality of conductors are based on the deformation.

6. The touch sensing apparatus of claim 4, wherein each of the plurality of conductors is a magnetic sensor configured to undergo a deformation in response to the change in the magnetic field caused by the first touch input;

the changes in distances between the reference conductor and each of the plurality of conductors are based on the deformation.

7. The touch sensing apparatus of claim 1, wherein a direction between the reference conductor and the touch position is determined based on a position of one of the plurality of conductors undergoing a maximum change in capacitance with the reference conductor in response to the change in the magnetic field caused by the first touch input among the plurality of conductors; and the touch position is determined based on the direction between the touch position and the reference conductor in each of the plurality of magnetic sensor units.

8. The touch sensing apparatus of claim 7, wherein the plurality of conductors surrounding the reference conductor have substantially the same distance to the reference conductor absent of an exogenous magnetic field; and the direction between the reference conductor and the touch position is determined based on a position of one of the plurality of conductors having a maximum capacitance with the reference conductor in response to the change in the magnetic field caused by the first touch input among the plurality of conductors.

9. The touch sensing apparatus of claim 1, wherein the reference conductor has a substantially rod shape; and each of the plurality of conductors has a substantially plate shape.

10. The touch sensing apparatus of claim 5, wherein the reference conductor is made of a magnetizable metal.

11. The touch sensing apparatus of claim 1, wherein the reference conductor and the plurality of conductors are made of non-transparent metal materials.

12. The touch sensing apparatus of claim 1, wherein the plurality of magnetic sensor units comprises at least three magnetic sensor units.

13. The touch sensing apparatus of claim 1, wherein at least a portion of the reference conductor body in the respective one of the plurality of magnetic sensor units is spaced apart from the plurality of conductors by air or an insulating liquid provided between the first base substrate and the second base substrate.

14. A touch control display panel, comprising the touch sensing apparatus of claim 1, and a display panel.

15. The touch control display panel of claim 14, having a display area configured to display an image and a peripheral area in which an image is not displayed;

wherein the central area is the display area of the touch control display panel; and the plurality of magnetic sensor units are in the peripheral area.

16. The touch control display panel of claim 14, further comprising a stylus comprising a magnet.

17. A touch control display apparatus, comprising a touch control display panel of claim 14.

18. A touch sensing method, comprising:

providing a plurality of magnetic sensor units between a first base substrate and a second base substrate; a respective one of the plurality of magnetic sensor units comprising a reference conductor and a plurality of conductors surrounding the reference conductor;

independently connecting the reference conductor and each of the plurality of conductors to a first touch integrated circuit;

arranging the plurality of magnetic sensor units spaced apart from each other and respectively surrounding a periphery of a central area;

fixedly attaching a first end of the reference conductor to the first base substrate, fixedly attaching a second end of the reference conductor to the second base substrate, a reference conductor body of the reference conductor continuously extending from the first end to the second end;

fixedly attaching a third end of a respective one of the plurality of conductors to the first base substrate, fixedly attaching a fourth end of the respective one of the plurality of conductors to the second base substrate, a conductor body of the respective one of the plurality of conductors continuously extending from the third end to the fourth end;

arranging the plurality of conductors in the respective one of the plurality of magnetic sensor units along a virtual partial circular line or a virtual full circular line centering around the reference conductor so that distances respectively between a mid-point of the reference conductor body of the reference conductor and mid-points of the conductor bodies of the plurality of conductors are substantially the same;

arranging the plurality of conductors in each of the plurality of magnetic sensor units so that the virtual partial circular line or the virtual full circular line is between the central area and the reference conductor;

detecting changes in capacitances between the reference conductor and each of a plurality of conductors surrounding the reference conductor; and determining a direction between the reference conductor in each of the plurality of magnetic sensor units and a touch position based on the changes in capacitances between the reference conductor and each of a plurality of conductors surrounding the reference conductor in each of the plurality of magnetic sensor units.

19. The touch sensing method of claim 18, wherein detecting the changes in capacitances between the reference conductor and each of the plurality of conductors surrounding the reference conductor comprises detecting changes in distances between the reference conductor and each of the plurality of conductors surrounding the reference conductor.

20. The touch sensing method of claim 19, wherein detecting the changes in distances between the reference conductor and each of the plurality of conductors surrounding the reference conductor comprises deforming the reference conductor in response to the change in a magnetic field caused by a touch input.

\* \* \* \* \*